Inventors:
Norman A. Smith,
Kermit L. Darrah,
by
Their Attorney.

Patented Apr. 8, 1952

2,591,734

UNITED STATES PATENT OFFICE 2,591,734

PLANETARY GEAR CONSTRUCTION

Norman A. Smith, Saugus, and Kermit L. Darrah, Lynnfield Center, Mass., assignors to General Electric Company, a corporation of New York Application January 3, 1949, Serial No. 68,898

2 Claims. (Cl. 74—801)

This invention relates to planetary gear trains, particularly to an improved arrangement for supporting the planet gears in such a manner as to insure that torsional distortion of the cage structure, due to high torque leads, will not be transmitted to the planets, so that there will be no tendency for the axes of the planets to deviate from their intended parallel relation to the axis of the sun gear. The invention is particularly applicable to planetary gearing for the transmission of large amounts of power, for instance ship propulsion gears transmitting in the neighborhood of 10,000 H. P., where the torque transmitted is so large as to cause deflection of the cage member and resulting uneven wear of the gear teeth when the cage arrangements of the prior art are used. This invention constitutes a further improvement on the planetary cage structure disclosed in the copending application of Charles T. Thompson filed November 23, 1948, Serial No. 61,667, and assigned to the same assignee as the present application.

Heretofore, conventional practice in planetary gear design has been to make the planet supporting cage an integral rigid assembly to which torque is applied at one end. Tests of a large planetary type marine propulsion gear have shown that this type of construction results in torsional deflection of the cage structure, with the result that the axes of the planet gears assume a "skewed" relation to the axis of the sun gear, with the result that tooth wear becomes uneven, the noise level of the gears in operation increases, and the life of the gears is appreciably shortened. The purpose of the present arrangement is to provide another improved cage construction, embodying the basic principle covered by the above-mentioned application of C. T. Thompson, which eliminates this torsional deflection and the accompanying deviation of the planet axes from their intended optimum relation with the sun and ring gears.

Another object is to provide an improved cage structure of the general type described which, while perhaps not having as large a load-carrying capacity as that of the above-mentioned application of C. T. Thompson, has fewer and simpler parts and is therefore cheaper and easier to build and service.

Figure 1:
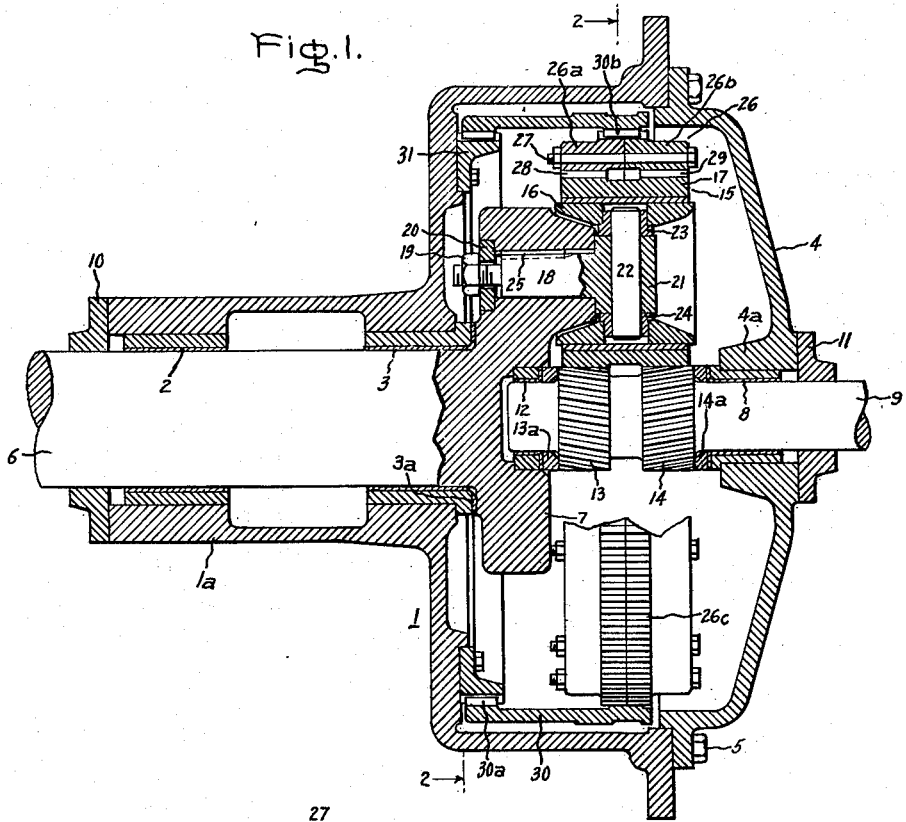
Figure 2:
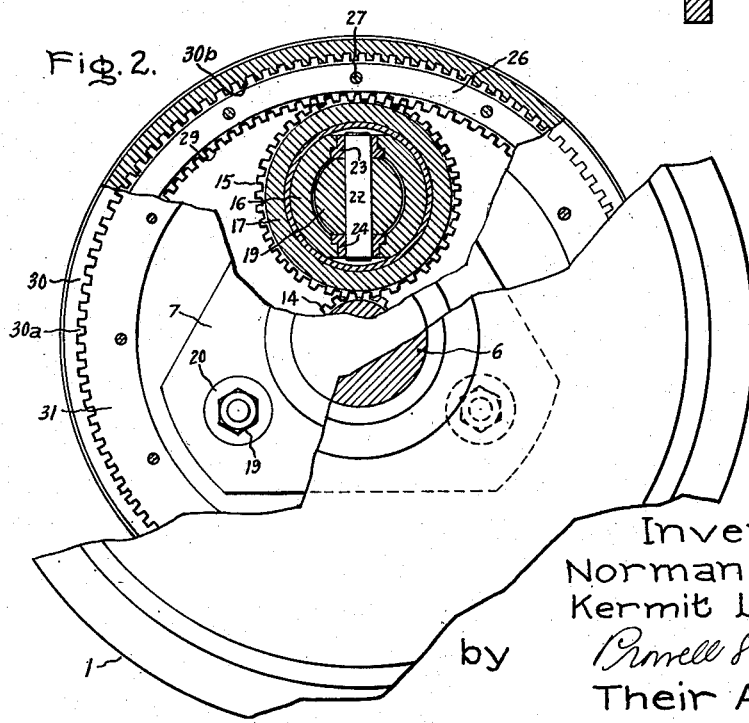

Other objects and advantages will be apparent from the following description taken in connection with the accompanying drawings in which Fig. 1 is a sectional view of a planetary gear incorporating the invention, and Fig. 2 is a broken- away view, partly in section, taken on the irregular plane 2—2 in Fig. 1.

Referring now more particularly to Fig. 1, this improved planetary gear includes a housing indicated generally at 1 including a bearing housing portion 1a containing suitable journal bearings 2, 3 and a separately formed end plate 4 secured by suitable threaded fastenings 5 to the gear casing proper. Journalled in the bearings 2, 3 is an input shaft 6 having secured to the end thereof, in overhung relation to the bearings, a planet supporting member 7 generally triangular in plan, as may be readily seen in Fig. 2. As will be apparent from Fig. 1, the journal bearing 3 is provided with an end portion 3a forming a thrust bearing surface engaging an annular surface of the end member 7.

The housing end plate 4 has a central portion 4a forming a support for a third journal bearing 8 for the output shaft 9. Suitable shaft seal assemblies 10, 11 are provided at either end of the housing.

As may be seen in Fig. 1, the internal end of the sun pinion shaft 9 is supported in a journal bearing 12 carried in a central recess of the other rotor end member 7. In the present case, the sun gear is formed as two separate helical gears 13, 14 having their teeth oppositely inclined so as to form a "double helical gear," in a manner which will be understood by those skilled in the art. For convenience, this double helical sun gear may be formed integral with the shaft 9. Suitable spacer rings 13a, 14a, are interposed between the gears 13, 14, and the adjacent thrust surfaces of the journal bearings 12, 8, as will be seen in Fig. 1 of the drawing.

In accordance with the invention, the planets, indicated generally at 15, are of a special composite construction including a planet support member in the form of journal sleeve 16 arranged to engage the babbitted bore of the gear body 17. The journal support 16 is carried on the rotor end member 7 by means of a stud member 18 having a reduced diameter threaded end portion receiving a nut 19, the latter bearing against a removable washer 20 seated in a recess in rotor end member 7. The other end of stud 18 is provided with an enlarged head member 21 having a bore receiving a radial pin 22. As will be apparent from Figs. 1 and 2, the projecting ends of pin 22 are received in bushings 23, 24 which are seated in recesses in the journal support member 16. By this arrangement, the support member 16 is free to be somewhat self-aligning about a radial axis, relative to the support stud 18 and the rotor end member 7. It will be understood of course that means are provided for preventing relative rotation between the stud 18 and the arm of rotor end member 7. This may take the form of a spline or any other suitable means, such as the simple key shown at 25. Thus the pin 22 forms a radial axis for the self-aligning journal support member 16 to pivot about. It is to be particularly noted that the axis of the pin 22 is at the middle of the combined face width of the sun gear 13, 14.

The ring gear, indicated generally at 26 may be formed in halves, secured by the through-bolts 27 for convenience in assembling the ring gear halves 26a, 26b with the planet gears. The ring gear assembly 26 is supported in torque transmitting relation with the casing by means of a coupling sleeve 30 having axially spaced spur teeth 30a, 30b. The teeth 30a mesh with similar teeth on a ring 31 bolted to the inner wall of the housing, while the other set of teeth 30b mesh with teeth 26c formed on the outer circumference of the ring gear assembly. Thus it will be seen that the ring gear is permitted to float axially a limited amount in order to obtain a self-aligning centering action between the internal teeth of the ring gear and the double helical teeth of the planets. The ring gear is also permitted, by the clearances in the meshing gear teeth 30a, 30b, to adjust itself slightly in a radial direction so as to properly mesh with the planets. This floating support for the ring gear is similar to that described in the above-mentioned copending application of C. T. Thompson, and does not form a part of the present invention.

While shaft 6 has been referred to as the input member and shaft 9 as the output, it will be obvious to those skilled in the art that either shaft may drive and either be driven. As a matter of fact, in ship propulsion gear the small shaft 9 would be the high-speed input shaft, while shaft 6 would be coupled to the propeller shaft. Whichever is the case, it will be apparent from the above description of the structure that torque is transmitted from the planet gears to the rotor end member 7 by a connecting means located at the middle of the face width of the gears, as in the copending application of C. T. Thompson. The self-aligning connection between the planet support stud 18 and the planet gear assembly 15 permits a limited degree of adjustment between the planet gear teeth and the ring and sun gears. Thus if the torque applied to the planets should cause the support studs 18 and the related portions of end member 7 to deflect, no corresponding deflection would be transmitted to the planet gear assemblies 15, which, by reason of their self-aligning support, are free to remain in proper engaging relation with the sun and ring gear teeth. Thus the tendency of the planets to assume a skewed relation to the sun and ring gears, as a result of torsional deflection of the planet supporting member, is eliminated.

It will be apparent from the above description of this improved structure that the comparatively few parts are simple to manufacture and assemble. Also the improved mechanical arrangement of this gearing permits a ready means of disassembly. After removal of the end plate 4, the sun pinion shaft 9, planet gear bodies 17, and the ring gear assembly 26 may be withdrawn from the housing as a unit, the babbitted bore of the planets 17 sliding axially from the journal support members 16. By unbolting and removing the two halves of the ring gear 26a, 26b, the planet gear bodies may be freed from disengagement from the sun pinion 13, 14. The shaft 6 may then be removed from the journal bearings 2, 3, after which the planet support studs 18 are readily removed by disassembling the nuts 19. Removal of the support pin 22 frees the journal members 16 and their bushings 23, 24.

While only one specific embodiment has been described herein, it will be apparent to those skilled in the art that many changes may be made in the mechanical details of gearing incorporating this invention. For instance, instead of the "hinged journal" arrangement for the planets described herein, we may provide a spherical self-aligning connection between the studs 18 and support members 16. Or the well-known "crowned spline" or involute tooth types of flexible coupling might be employed. It is intended to cover by the appended claims all such modification as fall within the true spirit and scope of the invention.

What we claim as new and desire to secure by Letters Patent of the United States is:

1. A planetary gear train including a sun pinion, a ring gear, and at least one planet gear interposed therebetween and having a central axial bore, means supporting the planet gear including a cage member adapted to transmit torque to and from the planet gear and including a journalled rotor with an axially extending end portion eccentric with the rotor, a planet support stud having an axially extending portion secured in said rotor end portion and a head portion forming an axial extension of said rotor end portion, said head portion having radially spaced portions forming bearing means with a common radial axis relative to the sun and ring gears, a sleeve journal member surrounding said head member and rotor end portion and having diametrically opposed bores engaging said bearing means for limited oscillation about an axis disposed radially relative to the sun and ring gears, the sleeve journal member also having an outer circumferential surface forming a journal with an axially disposed axis rotatably engaging the central bore in the planet gear, the axis of said bearing means lying in a radial plane substantially at the middle of the face width of the gears, whereby the planet gear may seek proper engagement with the sun and ring gears irrespective of bending deflections produced in the planet support member.

2. A planetary gear train having a sun pinion, a ring gear, and at least one planet gear interposed therebetween, means supporting the planet gear including a cage member adapted to transmit torque to and from the planet gear and including a journalled rotor with a substantially cylindrical axially extending end portion eccentric with the rotor axis, a cylindrical sleeve journal member surrounding said rotor end portion, the planet gear having a central axial bore receiving the journal member, and self-aligning means connecting the rotor end portion and journal member in torque transmitting relation and including a dowel pin secured in the rotor end portion with its axis disposed radially relative to the sun and ring gears at an axial location substantially at the middle of the face width of the gears, and bearing means associated with the respective end portions of said dowel projecting from opposite sides of the rotor end portion, said bearing means supporting the sleeve journal member for limited oscillation of the planet gear about a radial axis, whereby forces tending to skew the axis of the planet gear from parallel relation with the other gears will not be transmitted from the rotor to the planet gear.

NORMAN A. SMITH.
KERMIT L. DARRAH.

REFERENCES CITED

The following references are of record in the file of this patent:

UNITED STATES PATENTS

| Number | Name | Date |
|---|---|---|
| 1,120,355 | Ahlm | Dec. 8, 1914 |
| 2,127,463 | Chilton | Aug. 16, 1938 |
| 2,460,629 | Fawick | Feb. 1, 1949 |

FOREIGN PATENTS

| Number | Country | Date |
|---|---|---|
| 444,697 | Germany | Feb. 8, 1924 |
| 606,634 | Germany | Nov. 27, 1931 |